(12) United States Patent
Bontu et al.

(10) Patent No.: US 8,855,240 B2
(45) Date of Patent: Oct. 7, 2014

(54) CHANNEL ESTIMATION AND DATA DETECTION IN A WIRELESS COMMUNICATION SYSTEM IN THE PRESENCE OF INTER-CELL INTERFERENCE

(75) Inventors: Chandra S. Bontu, Nepean (CA); Amin Mobasher, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1190 days.

(21) Appl. No.: 12/705,568

(22) Filed: Feb. 12, 2010

(65) Prior Publication Data

US 2011/0200126 A1  Aug. 18, 2011

(51) Int. Cl.
*H03K 9/00* (2006.01)
*H04L 27/00* (2006.01)
*H04L 27/06* (2006.01)
*H04L 25/02* (2006.01)
*H04L 5/00* (2006.01)

(52) U.S. Cl.
CPC ........... *H04L 25/0232* (2013.01); *H04L 5/0023* (2013.01)
USPC ............ 375/316; 375/324; 375/340; 375/341

(58) Field of Classification Search
USPC ......................... 375/226–239, 219, 222, 240, 375/240.26–240.29, 262, 316, 295, 346, 375/347, 348, 350, 324, 340, 341
See application file for complete search history.

(56) References Cited

U.S. PATENT DOCUMENTS

| | | | | |
|---|---|---|---|---|
| 2003/0003889 | A1* | 1/2003 | Perets | 455/266 |
| 2005/0147025 | A1* | 7/2005 | Auer | 370/203 |
| 2006/0045194 | A1 | 3/2006 | Athanasios et al. | |
| 2008/0049814 | A1 | 2/2008 | Jeon | |
| 2008/0130771 | A1* | 6/2008 | Fechtel et al. | 375/260 |

(Continued)

FOREIGN PATENT DOCUMENTS

| | | |
|---|---|---|
| CN | 101375567 A | 2/2009 |
| EP | 1968225 A1 * | 9/2008 |
| WO | 2004073180 A2 | 8/2004 |

OTHER PUBLICATIONS

PCT International Search Report; PCT Application No. PCT/CA2011/050081; Apr. 21, 2011; 3 pages.

(Continued)

*Primary Examiner* — Sam K Ahn
*Assistant Examiner* — Linda Wong
(74) *Attorney, Agent, or Firm* — Conley Rose, P.C.; J. Robert Brown, Jr.

(57) ABSTRACT

Channel estimation and data detection in a wireless communication system in the presence of inter-cell interference is provided. In one embodiment, a method for channel estimation and data detection in a wireless communication system, comprising receiving a signal, wherein said signal is composed of a data signal, a desired reference signal and an interference reference signal; selecting a channel estimator using said desired reference signal, said interference reference signal or both; applying said selected channel estimator to said desired reference signal, said interference reference signal or both to generate one or more reference signal channel estimate weights; generating one or more data channel estimate weights using said reference signal channel estimate weights; selecting a data detector using said reference signal channel estimate weights, said data channel estimate weights or both; and detecting said data signal using said selected data detector, wherein said selected data detector uses said reference signal channel estimate weights, said data channel estimate weights or both.

16 Claims, 9 Drawing Sheets

(56) References Cited

U.S. PATENT DOCUMENTS

| | | | |
|---|---|---|---|
| 2008/0192846 A1* | 8/2008 | Bjerke et al. ................. | 375/260 |
| 2009/0052566 A1* | 2/2009 | Maltsev et al. ............... | 375/260 |
| 2009/0113429 A1* | 4/2009 | Luschi et al. ................. | 718/100 |
| 2010/0322357 A1* | 12/2010 | Krasny et al. ................ | 375/341 |

OTHER PUBLICATIONS

PCT Written Opinion of the International Searching Authority; PCT Application No. PCT/CA2011/050081; Apr. 21, 2011; 4 pages.

Coleri, Sinem, et al.; "A Study of Channel Estimation in OFDM Systems"; IEEE; 2002; 5 pages.

Edfors, Ove, et al.; "OFDM Channel Estimation by Singular Value Decomposition"; IEEE Trans. on Comm.; Jul. 1998; 5 pages.

Van De Beek, Jan-Jaap, et al.; "On Channel Estimation in OFDM Systems"; IEEE VTC; Sep. 1995; 6 pages.

Hsieh, Meng-Han, et al.; "Channel Estimation for OFDM Systems Based on Comb-type Pilot Arrangement in Frequency Selective Fading Channels"; IEEE Trans. on Consumer Electronics; Feb. 1998; 9 pages.

Hadaschik, Niels, et al.; "Joint Narrowband Interference Detection and Channel Estimation for Wideband OFDM"; Apr. 2007; 7 pages.

3GPP TS 36.211 V8.6.0; 3rd Generation Partnership Project; Technical Specification Group Radio Access Network; Evolved Universal Terrestrial Radio Access (E-UTRA); Physical Channels and Modulation; Release 8; Mar. 2009; 83 pages.

3GPP TR 36.814 V1.1.1; 3rd Generation Partnership Project; Technical Specification Group Radio Access Network; Further Advancements for E-UTRA Physical Layer Aspects; Release 9; Jun. 2009; 39 pages.

Edfors, Ove, et al.; "OFDM Channel Estimation by Singular Value Decomposition"; IEEE Transactions on Communications; vol. 46; Issue No. 7; Jul. 1998; 10 pages.

Taiwan Office Action; Application No. 100104706; Dec. 19, 2013; 5 pages.

Taiwan Office Action; Application No. 100104706; May 19, 2014; 10 pages.

Canadian Office Action; Application No. 2,788,698; Jun. 5, 2014; 4 pages.

Chinese Office Action as Received in Co-pending Application No. 201180018816.1 Aug. 5, 2014; 7 pages. (No English translation available).

* cited by examiner

CHANNEL ESTIMATION AND DATA DETECTION IN A WIRELESS COMMUNICATION SYSTEM IN THE PRESENCE OF INTER-CELL INTERFERENCE

CROSS-REFERENCE TO RELATED APPLICATIONS

There are no related applications.

FIELD

The invention generally relates to wireless communication and in particular to channel estimation and data detection in a wireless communication system in the presence of inter-cell interference.

BACKGROUND

Wireless communication systems are widely deployed to provide, for example, a broad range of voice and data-related services. Typical wireless communication systems consist of multiple-access communication networks that allow users to share common network resources. Examples of these networks are time division multiple access ("TDMA") systems, code division multiple access ("CDMA") systems, single-carrier frequency division multiple access ("SC-FDMA") systems, orthogonal frequency division multiple access ("OFDMA") systems, or other like systems. An OFDMA system is adopted by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency and a better user experience especially in high-demand urban areas. LTE accomplishes this higher performance with the use of broader spectrum bandwidth, OFDMA and SC-FDMA air interfaces, and advanced antenna methods.

Communications between wireless devices and base stations may be established using single-input, single-output ("SISO") mode, where only one antenna is used for both the receiver and transmitter; single-input, multiple-output ("SIMO") mode, where multiple antennas may be used at the receiver and only one antenna is used at the transmitter; multiple-input, single-output ("MISO") mode, where multiple antennas may be used at the transmitter and only one antenna is used at the receiver; and multiple-input, multiple-output ("MIMO") mode, where multiple antennas may be used at the receiver and transmitter. Compared to SISO mode, SIMO mode may provide increased coverage while MIMO mode may provide increased coverage and spectral efficiency and higher data throughput if the multiple transmit antennas, multiple receive antennas or both are utilized. When wireless devices using MIMO mode are employed additional MIMO operating modes are available. These operating modes include diversity MIMO mode, single-user MIMO mode, multiple-user MIMO mode and mixed MIMO mode. Diversity MIMO-mode uses multiple transmit and receive antennas to take advantage of the spatial dimensionality of the wireless communication radio frequency ("RF") channel to provide more reliable transmission of a single data channel. It is important to recognize that systems employing base stations using MIMO mode can typically support wireless devices operating in SISO mode, SIMO mode, MISO mode, MIMO mode, other operating modes or combinations of operating modes.

Single-user MIMO ("SU-MIMO") mode takes advantage of the spatial dimensionality of the wireless communication RF channel by using multiple transmit and receive antennas to provide multiple concurrent transmission data channels for increased data rates of a single wireless device. Similarly, multiple-user MIMO ("MU-MIMO") mode uses multiple transmit and receive antennas to provide multiple concurrent transmission data channels to multiple wireless devices. Mixed MIMO mode concurrently supports the combination of SIMO and MIMO wireless devices on the same RF channel. Uplink ("UL") communication refers to communication from a wireless device to a base station. Downlink ("DL") communication refers to communication from a base station to a wireless device.

As specified in 3rd Generation Partnership Project; Technical Specification Group Radio Access Network; Physical Channels and Modulation (Release 8), 3GPP, 3GPP TS 36 series of specifications ("LTE Release 8"), the use of multiple antenna techniques is supported for DL transmission. In 3rd Generation Partnership Project; Technical Specification Group Radio Access Network; Further Advancements For E-UTRA; Physical Layer Aspects (Release 9), 3GPP, 3GPP TR 36.814 V1.1.1 (2009 June) ("LTE-A Release 10"), multiple antenna techniques may be used to improve DL performance. Such multiple antenna techniques include, for instance, transmit diversity and spatial multiplexing. Various transmit diversity schemes may be used such as space-frequency block coding ("SFBC"), space-time block coding ("STBC"), frequency-switched transmit diversity ("FSTD"), time-switched transmit diversity ("TSTD"), pre-coding vector switching ("PVS"), cyclic-delay diversity ("CDD"), space-code transmit diversity ("SCTD"), spatial orthogonal resource transmission diversity ("SORTD"), and other similar approaches. Some of these approaches have been adopted for use in LTE Release 8.

Channel estimation techniques including for use in orthogonal frequency division multiplex ("OFDM") systems have been extensively described in the literature. Coleri et al., *A Study of Channel Estimation in OFDM Systems*, IEEE proc. VTC 2002 Fall, pp. 894-898, presented an overview of channel estimation and interpolation techniques for OFDM systems. Simplified minimum mean-square error ("MMSE") estimators are described in Edfors et al., *OFDM Channel Estimation by Singular Value Decomposition*, IEEE Trans. On Commn., Vol. 46, Issue 7, July 1998, pp. 931-939, and Van de Beek et al., *On Channel Estimation in OFDM Systems*, IEEE VTC, 1995, pp. 815-819. Hsieh et al., *Channel Estimation for OFDM Systems Based on COMP-type Pilot Arrangement in Frequency Selective Fading Channels*, IEEE Trans. on Consumer Electronics, Vol. 44, No. 1, February 1998, pp. 217-225, describes performance results comparing MMSE estimation with transform-domain interpolation. Hadaschik et al., *Joint Narrowband Interference Detection and Channel Estimation for Wideband OFDM*, Proceedings of European Wireless Conference, April 2007, explores the narrow-band interference detection and channel estimation in wideband OFDM. In most of these publications, the channel estimation techniques do not consider the effects of co-channel inter-cell interference. In a typical network deployment, inter-cell interference can affect the channel estimation calculated at a wireless device.

In LTE systems, a reference signal ("RS") is a pre-determined signal, typically known by both base stations and wireless devices and used for channel estimation. The RS may also be referred to as a pilot signal, training signal, synchronization signal, sounding signal or other similar term. A base station typically transmits a plurality of RS signals to allow each wireless device to estimate the propagation properties of the RF channel. Upon deriving channel estimates, such estimates may also be used for demodulation of the information transmitted by a base station.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in wireless communication systems, it will be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed examplaries are not the only way to implement such methods, devices and systems, and the drawings and descriptions should be regarded as illustrative in nature and not restrictive.

Various techniques described herein can be used for various wireless communication systems. The various aspects described herein are presented as methods, devices and systems that can include a number of components, elements, members, modules, nodes, peripherals, or the like. Further, these methods, devices and systems can include or not include additional components, elements, members, modules, nodes, peripherals, or the like. In addition, various aspects described herein can be implemented in hardware, firmware, software or any combination thereof. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form. It is important to note that the terms "network" and "system" can be used interchangeably.

Wireless communication networks consist of a plurality of wireless devices and a plurality of base stations. A base station may also be called a node-B ("NodeB"), a base transceiver station ("BTS"), an access point ("AP"), a cell, or some other equivalent terminology. Further, the term "cell" can represent a specific base station, a specific sector of a base station, a specific antenna of a sector of a base station or any combination thereof. A base station typically contains one or more radio frequency ("RF") transmitters and receivers to communicate with wireless devices. Further, a base station is typically fixed and stationary. For LTE and LTE-A equipment, the base station is also referred to as an E-UTRAN NodeB ("eNB") or evolved eNB.

A wireless device used in a wireless communication network may also be referred to as a mobile station ("MS"), a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a base station. Further, a wireless device may be fixed or mobile and may have the ability to move through a wireless communication network. For LTE and LTE-A equipment, the wireless device is also referred to as user equipment ("UE").

Figure 1:
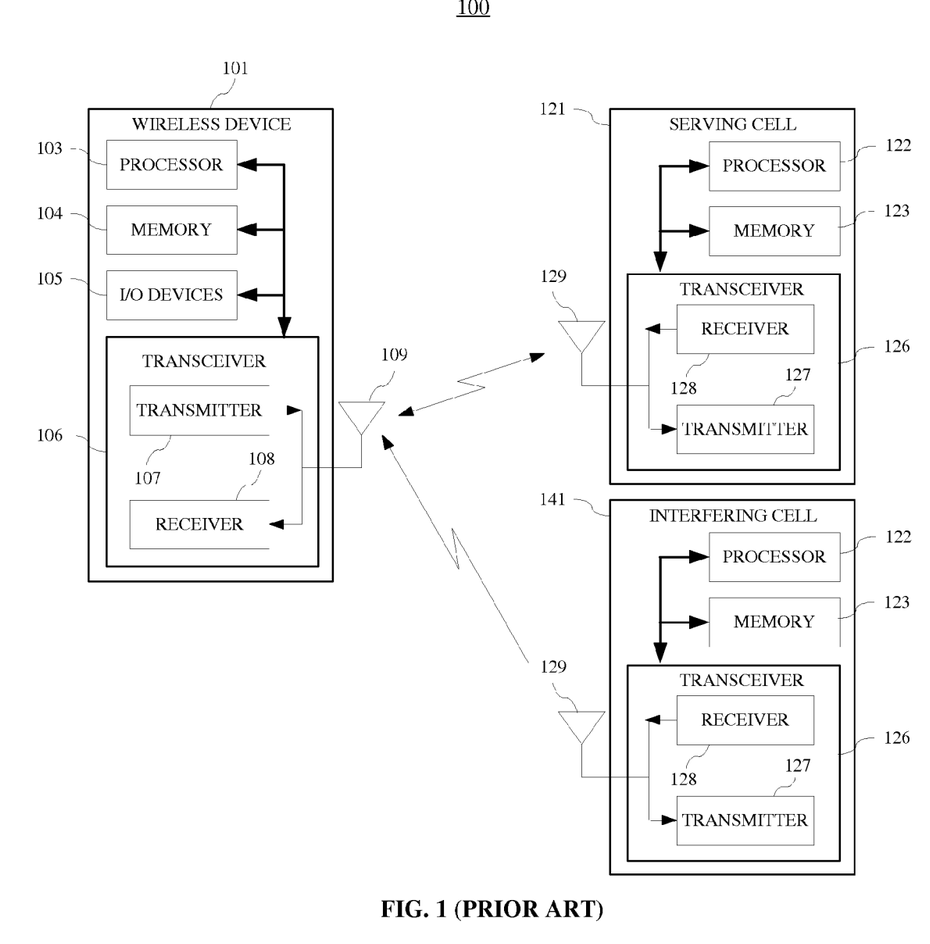
FIG. 1 illustrates an example wireless communication system.

This disclosure provides various embodiments of channel estimation and data detection techniques including suppressing the effects of co-channel interference. FIG. 1 is an example block diagram of system 100 for wireless communication. In one embodiment, system 100 can include one or more wireless devices 101 and one or more base stations 121 and 141. Base station 121 can also be referred to as a serving cell, cell-0, or other similar term. Base station 141 can also be referred to as a neighbor cell, interfering cell, cell-n, or other similar term. Base station 141 can communicate with other wireless devices using the same or similar RF channels as used between base station 121 and wireless device 101. Such use of the RF channels by base station 141 may interfere with communications between base station 121 and wireless device 101. Such interference may also be referred to as inter-cell interference, co-channel interference or other similar term.

In accordance with one aspect, wireless device 101 can include processor 103 coupled to memory 104, input/output devices 105, transceiver 106 or any combination thereof, which can be utilized by wireless device 101 to implement various aspects described herein. Transceiver 106 of wireless device 101 includes one or more transmitters 107 and one or more receivers 108. Further, associated with wireless device 101, one or more transmitters 107 and one or more receivers 108 are connected to one or more antennas 109.

Similarly, base station 121 and 141 can also include processor 122 coupled to memory 123 and transceiver 124. Transceiver 124 of base station 121 and 141 includes one or more transmitters 125 and one or more receivers 126. Further, associated with base station 121 and 141, one or more transmitters 127 and one or more receivers 128 are connected to one or more antennas 129.

Base station 121 can communicate with wireless device 101 on the UL using one or more antennas 109 and 129, and on the DL using one or more antennas 109 and 129, associated with the wireless device 101 and base station 121, respectively. Base station 121 can originate DL information using one or more transmitters 127 and one or more antennas 129, where it can be received by one or more receivers 108 at wireless device 101 using one or more antennas 109. This information can be related to one or more communication links between base station 121 and wireless device 101.

Once information is received by wireless device 101 on the DL, wireless device 101 can process the received information to generate a response relating to the received information. This response can then be transmitted back from wireless device 101 on the UL using one or more transmitters 107 and one or more antennas 109, and received at base station 121 using one or more antennas 129 and one or more receivers 128.

Figure 2:
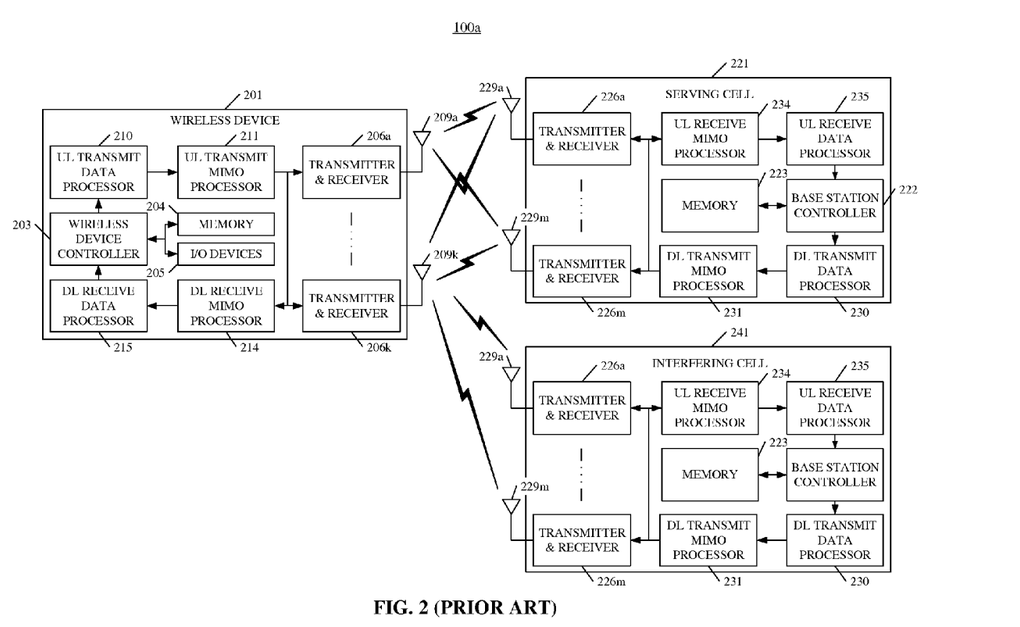
FIG. 2 illustrates an example MIMO wireless communication system.

FIG. 2 is an example block diagram of system 200 for MIMO wireless communication. In FIG. 2, system 200 can include one or more wireless devices 201 and one or more base stations 221 and 241. Base station 221 can also be referred to as a serving cell, cell-0, or other similar term. Base station 241 can also be referred to as a neighbor cell, interfering cell, cell-n, or other similar term. Base station 241 can communicate with other wireless devices using the same or similar RF channels as used between base station 221 and wireless device 201. Such use of the RF channels by base station 241 may interfere with communications between base station 221 and wireless device 201. Such interference may also be referred to as inter-cell interference, co-channel interference or other similar term.

In this embodiment, wireless device 201 can include wireless device controller 203 coupled to memory 204, input/output devices 205, UL transmit data processor 210, UL transmit MIMO processor 211, transmitters and receivers 206a to 206k, DL receive MIMO processor 214, DL receive data processor 215 or any combination thereof, which can be utilized by wireless device 201 to implement various aspects described herein. Further, associated with wireless device 201, one or more transmitters and receivers 206a to 206k are connected to one or more antennas 209a to 209k.

Similarly, base station 221 and 241 can include base station controller 222 coupled to memory 223, DL transmit data processor 230, DL transmit MIMO processor 231, transmitters and receivers 226a to 226m, UL receive MIMO processor 234, UL receive data processor 235 or any combination thereof, which can be utilized by base station 221 and 241 to implement various aspects described herein. Further, associated with base station 221 and 241, one or more transmitters and receivers 226a to 226m are connected to one or more antennas 229a to 229m.

Base station 221 can communicate with wireless device 201 on the UL and on the DL using one or more antennas 209a to 209k and 229a to 229m, associated with wireless device 201 and base station 221, respectively. In one embodiment, base station 221 can originate DL information using one or more transmitters 226a to 226m and one or more antennas 229a to 229m, where it can be received by one or more receivers 206a to 206k at wireless device 201 using one or more antennas 209a to 209k. This information can be related to one or more communication links between base station 221 and wireless device 201. Once information is received by wireless device 201 on the DL, wireless device 201 can process the received information to generate a response relating to the received information. This response can then be transmitted back from wireless device 201 on the UL using one or more transmitters 206a to 206k and one or more antennas 209a to 209k, and received at base station 221 using one or more antennas 229a to 229m and one or more receivers 226a to 226m.

Figure 3A:
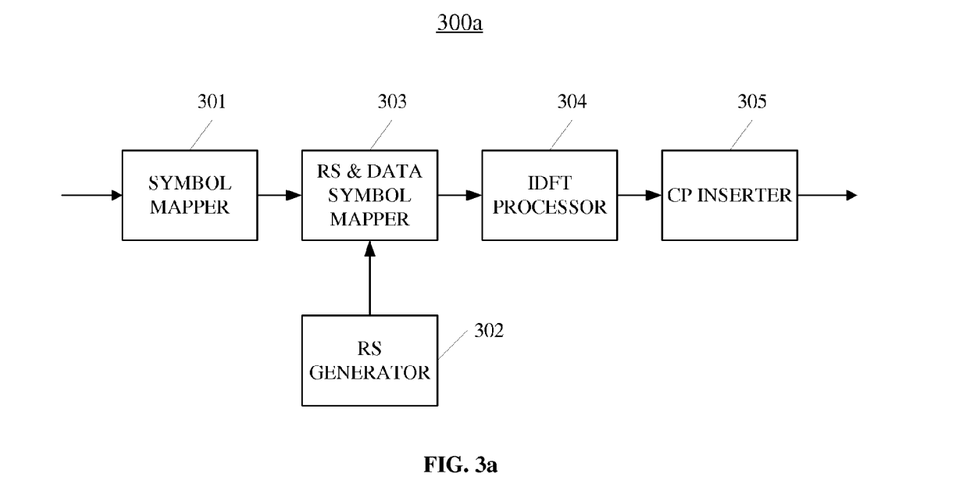
FIG. 3a illustrates one embodiment of a RS-assisted OFDM transmission system in accordance with various aspects set forth herein.

FIG. 3a illustrates RS-assisted OFDM transmission system 300a in accordance with various aspects set forth herein. In FIG. 3a, symbol mapper 301 can group, map or both binary information bits, $I_j$, onto, for instance, a signal constellation associated with a modulation scheme to form data symbols, $A_j$. RS generator 302 can determine the RS symbols for an information frame such as used in OFDMA systems. RS and data symbol mapper 303 can insert data symbols, $A_j$, and known, pre-determined RS symbols into the frame to form a signal $S_{km}$, where k=0, . . . , N−1, m=0, . . . , v−1; N indicates the length of the discrete Fourier transform ("DFT"); and v represents the number of data symbols, $A_j$, within the OFDMA subframe. IDFT processor 304 can perform an inverse discrete Fourier transform ("IDFT") over the symbols of the signal, $S_{km}$, within the frame to form a time-domain signal, $s_{km}$. A person of ordinary skill in the art will recognize that there are other methods of performing an inverse discrete Fourier transform such as using an inverse fast Fourier transform ("IFFT"). It is important to note that while this embodiment uses discrete-time signals, continuous-time signals or any combination of discrete-time signals and continuous-time signals may be used. CP inserter 305 inserts a cyclic prefix ("CP") into, for instance, the time-domain signal, $s_{km}$, and transmits the signal from base station 121 and 221 to wireless device 101 and 201. Further, guard time may be added between the frames to facilitate, for instance, frame synchronization at base station 121 and 221.

Figure 3B:
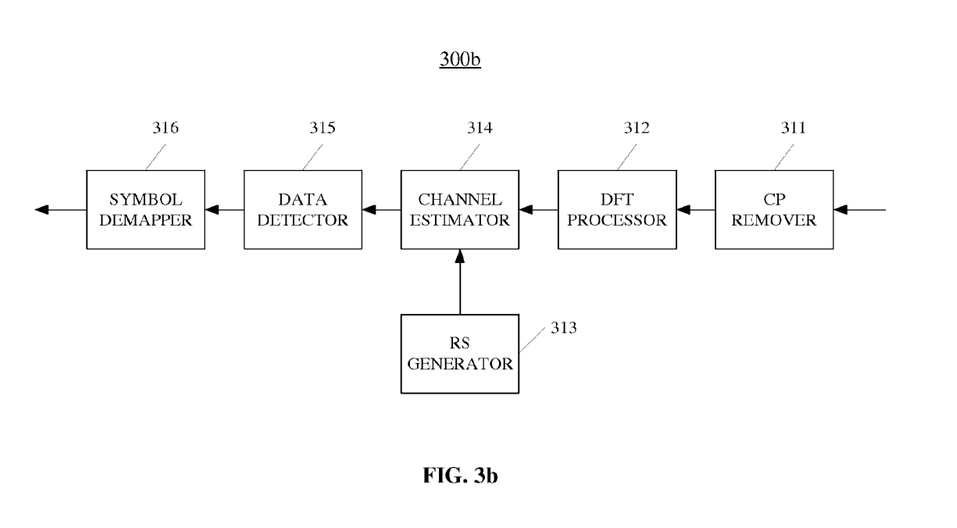
FIG. 3b illustrates one embodiment of a RS-assisted OFDM reception system in accordance with various aspects set forth herein.

FIG. 3b illustrates RS-assisted OFDM reception system 300b in accordance with various aspects set forth herein. In FIG. 3b, wireless device 101 and 201 receives the signal, $r_{km}$, from base station 121 and 221. CP remover 311 removes the CP from the signal, $r_{km}$. DFT processor 312 performs a discrete Fourier transform ("DFT") on the signal, $r_{km}$, to generate a discrete-time signal, $R_{km}$. A person of ordinary skill in the art will recognize that there are other methods of performing a discrete Fourier transform such as using a fast Fourier transform ("FFT"). It is important to note that while this embodiment uses discrete-time signals, continuous-time signals or any combination of discrete-time signals and continuous-time signals may be used.

RS generator 313 can generate the desired RS symbols for the frame. Channel estimator 314 can use the desired RS symbols to estimate the channel weights corresponding to the known RS locations within the frame. The channel weights of the resource elements ("RE") corresponding to the unknown data symbols within the frame can be obtained by, for instance, interpolating the RS channel weights over the frame. Data detector 315 can detect the signal, $R_{km}$, using the RS channel weights, the data channel weights or both. Symbol demapper 316 can ungroup, map or both signal, $R_{km}$, to form, for instance, a binary information signal, $I_j$.

Figure 4:
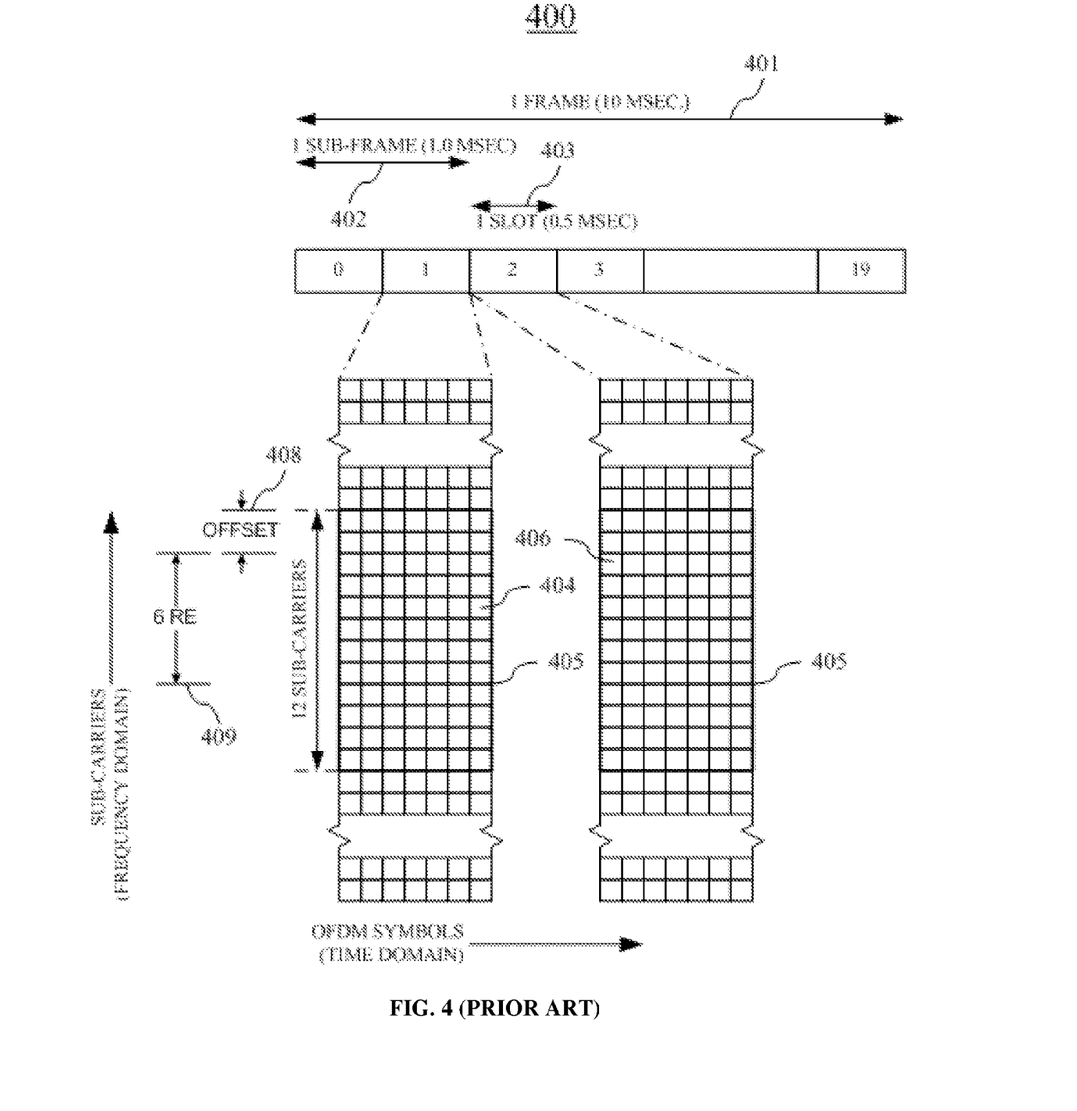
FIG. 4 illustrates an exemplary downlink channel structure that can be employed in a wireless communication system in accordance with various aspects set forth herein.

FIG. 4 illustrates an exemplary downlink channel structure 400 that can be employed in wireless communication system 100 and 200 in accordance with various aspects set forth herein. In one example, structure 400 can be employed in a system using LTE or LTE-A equipment or another appropriate wireless communication technology. In the current example of structure 400, a frame consists of twenty slots 403 of 0.5 milli-second ("msec") duration each, and one sub-frame 402 consists of two slots 403. Each slot 403 carries six or seven OFDM symbols in the time domain, depending on the type of CP used. In the exemplary, normal CP is used, and as such, seven OFDM symbols are transmitted in each slot. It is important to note that this disclosure is not limited to this particular frame structure and other frame structures can be supported.

Referring to FIG. 4, an exemplary of several resource blocks ("RB") 405 is shown. As a person of ordinary skill in the art will appreciate, RB 405 is a time-frequency allocation that is assigned to a wireless device and can be defined as the smallest unit of resource allocation by base station 121 and 221. Further, RB 405 may extend across a plurality of slots 403. Each RB 405 can carry twelve or fourteen OFDM symbols in the time domain, depending on the type of CP used, and may include twelve sub-carriers in the frequency domain. For example, the LTE DL may allow for a very high degree of flexibility allowing for any number of downlink RBs 405 ranging, for instance, from a minimum of six RBs 405 to a maximum of one hundred or more RBs 405. RB 405 can be comprised of a plurality of resource elements ("RE") 404, which can represent a single sub-carrier in frequency for a time period of one symbol.

The number of REs in each OFDM symbol can be a function of the system bandwidth. For example, an OFDM symbol can consist of six hundred REs, with each RE having a 15 kilo-hertz ("kHz") bandwidth, corresponding to a ten mega-hertz ("MHz") channel bandwidth. This configuration results in, for instance, the discrete-time signal, $S_{km}$, with length, N, of six hundred and parameter $v$ of fourteen. The number of RS symbols within one OFDM symbol can be, for instance, one hundred RS symbols for a ten MHz channel bandwidth.

The RS symbols can be, for instance, inserted periodically in OFDM symbol positions zero, four, seven and eleven, when normal CP is used. The position of the first RS RE symbol 406 can be, for instance, offset $\delta$ 408 with respect to the start of RB 405. Offset $\delta$ 408 from the start of RB 405 can be pre-determined for each physically adjacent cell to avoid, minimize or both any inter-cell interference from those cells. In LTE, offset $\delta$ 408 for cell-i can be set to, for instance, $\delta = \mod(i,6)$. The RS symbols transmitted can also be specific to each cell. RS symbols transmitted over the $m^{th}$ OFDM symbol in a sub-frame from cell-i can be formed using, for instance, a Gold sequence where one of its component pseudo-noise ("PN") codes is initialized with a register state dependent on parameters i and m.

In one embodiment, wireless device 101 and 201 can attach to serving cell 121 and 221, cell-0, having an offset $\delta$ 408 of zero. The dominant co-channel interferer can be from interfering cell 141 and 241, cell-n, having an offset $\delta = \mod(n,6)$ of zero. When offset $\delta = \mod(n,6)$ is zero, the RS transmitted from interfering cell 141 and 241, cell-n, can interfere with the RS transmitted from the serving cell 121 and 221, cell-0. $R_{km}$ represents the RE(k, m) received from serving cell 121 and 221, cell-0, by wireless device 101 and 201 and can be expressed as given by Equation (1). While Equation (1) represents one dominant co-channel interferer, Equation (1) can be readily modified to represent multiple co-channel interferers.

$$R_{km} = C_{km}^0 S_{km}^0 + C_{km}^n S_{km}^n + N_{km}, \qquad \text{(Equation 1)}$$

where $E[|S_{km}^0|^2] = E[|S_{km}^n|^2] = 1$.

$C_{km}^n$ can represent the channel weight of RE(k, m) and is associated with the RF channel propagation between the $n^{th}$ interfering cell 141 and 241, cell-n, and wireless device 101 and 201. $C_{km}^n$ can be modeled using, for instance, zero mean Gaussian random variables with variance $\gamma^n$. $S_{k,m}^n$ can represent the transmitted symbol over the RE(k, m) from the $n^{th}$ interfering cell 141 and 241, cell-n. $N_{km}$ can represent additive white Gaussian noise ("AWGN"). $C_{km}^n S_{km}^n$ can represent co-channel interference from the $n^{th}$ interfering cell 141 and 241, cell-n.

$\gamma^n$ can represent the path loss, which may include the effects of transmit antenna gain, receive antenna gain, shadow loss, other effects or combination of effects between $n^{th}$ interfering cell 141 and 241, cell-n, and wireless device 101 and 201. Equation (2) may be applied to the REs over which the known RS symbols are received.

$$S_{(\beta l + \alpha + \delta)m}^n = P_k^{n,m}(l), \qquad \text{Equation (2)}$$

where $k = \delta + \beta l + \alpha$, $m = 0, 4, 7, 11$, and $l = 0, \ldots, L-1$. The RS symbol sequence for cell-n over the $m^{th}$ OFDM symbol can be given by, for instance, $P^{n,m}(l)$ where $l = 0, \ldots, L-1$. The RS symbol sequence for cell-n over the $m^{th}$ OFDM symbol can also be given by P'(J) as described in 3GPP Technical Specification 36.211, E-UTRA, *Physical Channels and Modulation*, Release 8, v. 8.6.0, March 2009. In one embodiment, $\delta = \mod(n,6)$, $m = 0, 4, 7, 11$, and $\beta$ is six. Further, $\alpha$ is three when m is four or eleven, otherwise m is zero.

The received sample, $R_{km}$, for data REs can be given by Equation (3).

$$R_{km} = \rho_{km}^0 C_{km}^0 S_{km}^0 + \mu_{km} \rho_{km}^n C_{km}^n S_{km}^n + N_{km} \qquad \text{Equation (3)}$$

$\rho_{km}^n$ can represent the ratio of the average power of a data RE to a RS RE in the $n^{th}$ interfering cell 141 and 241, cell-n. The inverse of $$\rho_{km}^n, \frac{1}{\rho_{km}^n},$$

can represent the gain applied to the RS RE to improve the quality of the channel estimate. It is important to note that $\rho_{km}$ can be specific to each wireless device 101 and 201. $u_{km}$ can be set to zero for a given RB if such RB is not assigned to another wireless device by the $n^{th}$ interfering cell 141 and 241, cell-n. Alternatively, $u_{km}$ can be set to one if the RB is assigned to another wireless device by the $n^{th}$ interfering cell 141 and 241, cell-n. In the absence of interference from the $n^{th}$ interfering cell 141 and 241, cell-n, least squares ("LS") estimates of the channel weights, $\hat{C}_{km}^0$, at the RS REs can be given by, for instance, Equation (4).

$$\hat{C}_{km}^0 = R_{km}(S_{km}^0)^*, \quad \text{Equation (4)}$$

where $k=\delta+\beta l+\alpha$ for $l=0, \ldots, L-1$. In one example, $\delta=\mod(n,6)$, $m=0, 4, 7, 11$, and $\beta$ is six.

Subsequently, the channel weights across the frame can be obtained by interpolating the channel weight estimates, $\hat{C}_{km}^0$. The interpolated channel weight estimates can be used to generate MMSE estimates of the data symbols, $\hat{S}_{km}^0$, by using, for instance, Equation (5).

$$\hat{S}_{km}^0 = \frac{R_{km}(\hat{C}_{km}^0)^*}{|\hat{C}_{km}^0|^2 + \hat{N}_0} \quad \text{Equation (5)}$$

Where $\hat{N}_0$ represents power spectral density of the noise. The channel estimates, $\hat{C}_{km}^0$, may be filtered using a filter matched to the frequency correlation function of the channel weights resulting in MMSE estimates of the channel weights as described in, for instance, Van de Beek, *On Channel Estimation in OFDM Systems*, IEEE VTC, 1995, pp. 815-819. Further, the computational complexity of this channel estimation technique can be reduced as described in, for instance, Edfors et al., *OFDM Channel Estimation by Singular Value Decomposition*, IEEE Trans. on Comm., Vol. 46, Issue 7, July 1998, pp. 931-939.

Wireless device 101 and 201 can have knowledge of the RS sequence transmitted from an interfering cell. Wireless devices 101 and 201 may constantly monitor neighboring cells such as the $n^{th}$ interfering cell 141 and 241, cell-n, by, for instance, measuring the received power from the neighboring cells. Such measurements can be performed continuously, periodically, aperiodically or any combination thereof. $R_{km}$ can represent a column vector of the received samples corresponding to the RS REs over which the RS symbols are transmitted and can be derived using, for instance, Equation (6).

$$R_{km} = \begin{cases} R_{l(k,\mu,\upsilon)j(m,\mu,\upsilon)}, \\ \mu = -K, -K+1, \ldots, K; \\ \upsilon = -M, -M+1, \ldots, M \end{cases}, \quad \text{Equation (6)}$$

where $$l(k, \mu, \upsilon) = k + \beta\mu + \alpha\mod(\upsilon, 2),$$

$$j(m, \mu, \upsilon) = m + 4\upsilon - \left\lfloor \frac{\upsilon+\tau}{2} \right\rfloor,$$

$$\tau = \mod\left(\left\lceil \frac{m}{4} \right\rceil, 2\right),$$

$\beta$ is six, and $\alpha$ is 3.

Figure 9:
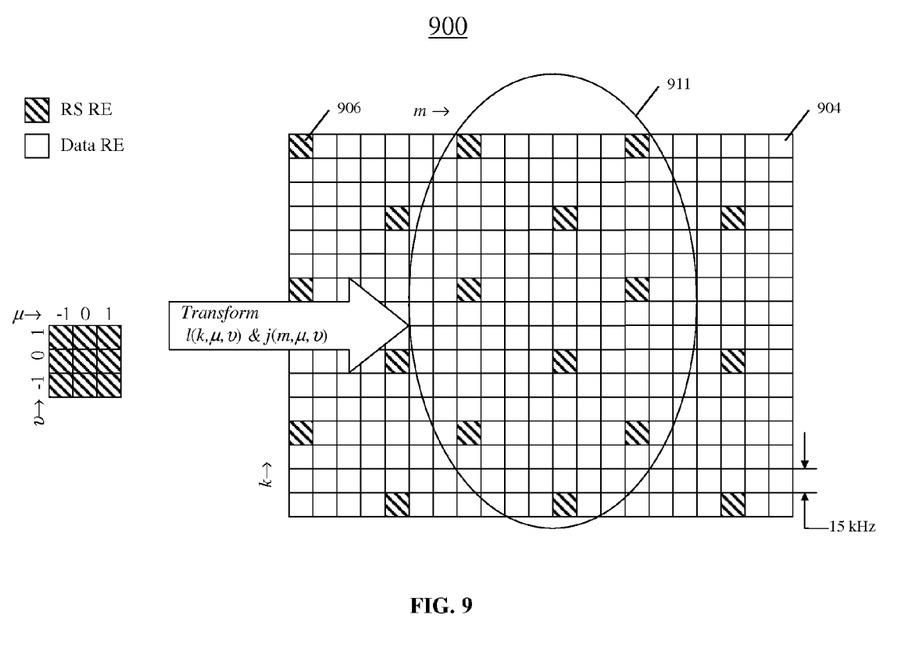
FIG. 9 is a graphical illustration of the transforms represented by several parameters used to detect received samples in a wireless communication system using an extended cyclic prefix ("CP") in accordance with various aspects set forth herein.

When $j(m, \mu, \nu)$ is less than zero, the previous sub-frame is considered. When $j(m, \mu, \nu)$ is greater than thirteen, the next sub-frame is considered. $\mod(j(m, \mu, \nu),14)$ indicates the OFDM symbol within the subframe. It is important to note that the value of fourteen is specific to the LTE and LTE-A standards and represents the number of OFDM symbols in one sub-frame with normal CP. For extended CP, this number is changed accordingly. FIG. 9 is a graphical illustration of the transforms represented by several parameters used to detect received samples in system 100 and 200 using an extended CP in accordance with various aspects set forth herein. For example, when K is one and M is one, the transforms represented by $l(k, \mu, \nu)$ and $j(m, \mu, \nu)$ can be depicted as illustrated in FIG. 9. The graphical illustration in its entirety is referred to by 900. In FIG. 9, RE symbol 904 can represent a single sub-carrier in frequency for a time period of one symbol. RS RE symbol 906 can represent a single sub-carrier in frequency for a time period of one RS symbol. Each RE has a 15 kHz bandwidth.

Let $S_{km}^n$ represent the complex symbols transmitted by base station 121 and 221 corresponding to the physical resources defined by the column vector $R_{km}$. Further, in the following description, for ease of understanding, the elements of the column vector $\{R_{l(k,\mu,\nu)j(m,\mu,\nu)}\}$ are represented as $R_{lj}$ without explicit mention of any mapping elements.

For a channel that is substantially constant over the received samples represented by the column vector, $R_{km}$, the estimates of the channel weights, $\{C_{km}^0, C_{km}^n\}$, represented by $\{\hat{C}_{km}^0, \hat{C}_{km}^n\}$, can be derived by maximizing the conditional probability given in Equation (7).

$$\arg\max_{C_{km}^0, C_{km}^n} \left[ p\left( \frac{\{C_{km}^0, C_{km}^n\}}{R_{km}} \right) \right] \quad \text{Equation (7)}$$

If the a priori probability of $\{C_{km}^0, C_{km}^n\}$ is ignored, Equation (7) can be simplified as given by Equation (8). However, if the a priori probability of $\{C_{km}^0, C_{km}^n\}$ is known, then the following procedure can be modified accordingly.

$$\arg\max_{C_{km}^0, C_{km}^n} \left[ p\left( \frac{R_{km}}{\{C_{km}^0, C_{km}^n\}} \right) \right] \quad \text{Equation (8)}$$

Assuming that the received samples can be modeled as independent and identically distributed ("iid") random variables, then the conditional probability can be expressed as given in Equation (9).

$$p\left( \frac{R_{km}}{\{C_{km}^0, C_{km}^n\}} \right) = \prod_{l=k-K}^{k+K} \prod_{j=m-M}^{m+M} p\left( \frac{R_{lj}}{\{C_{lj}^0, C_{lj}^n\}} \right)$$

In another embodiment, the channel weights, $\{C_{km}^0, C_{km}^n\}$, can be determined by taking the partial derivative of the logarithm of Equation (9) with respect to the channel weights, $\{C_{km}^0, C_{km}^n\}$, and equating to zero, as given by Equation (10).

$$\begin{bmatrix} \hat{C}_{km}^0 \\ \hat{C}_{km}^n \end{bmatrix} = P_{km}^{-1} \Gamma_{km},$$ Equation (10)

where $$P_{km} = \begin{bmatrix} (S_{km}^0)^H S_{km}^0 & (S_{km}^n)^H S_{km}^0 \\ (S_{km}^0)^H S_{km}^n & (S_{km}^n)^H S_{km}^n \end{bmatrix}$$

and $$\Gamma_{km} = \begin{bmatrix} (S_{km}^0)^H R_{km} \\ (S_{km}^0)^H R_{km} \end{bmatrix}.$$

The superscript $(\ )^H$ represents complex conjugate and transpose operation.

The matrix $P_{km}^{-1}$ can be pre-determined to reduce computational complexity. When the channel between base station 121 and 221 and wireless device 101 and 201 is slowly varying and less frequency selective, then M, K or both may be larger. Under such circumstances, the estimate of the channel weights, $\{\hat{C}_{km}^0, \hat{C}_{km}^n\}$, may be substantially constant over the estimation interval. A smaller value of K may be used when the RF channel between base station 121 and 221 and wireless device 101 and 201 is more frequency selective. A higher value of K can be used for improved suppression of noise and may tend to average the estimated channel weights, $\{\hat{C}_{km}^0, \hat{C}_{km}^n\}$. The F matrix can be the cross co-variance matrix between the RS of the serving cell 121 and 221, cell-0, and the RS of the nth interfering cell 141 and 241, cell-n. Further, the $P_{km}$ matrix may not be invertible for smaller values of K. Different values of K may be used to evaluate the performance of Equation (9) and may be dependent on the RS pattern used. For instance, K can be adaptively modified based on, for instance, the RE(k, m) location.

The estimated channel weights corresponding to the data REs can be determined by filtering the estimated channel weights at the RS RE locations. Estimates of the channel weights can be available at L RS REs across the OFDM symbols with the RS REs. Estimates of the channel weights on other OFDM symbols of data REs can be obtained by filtering the estimated channel weights at the RS RE locations. Interpolation filters matched to, for instance, a channel time-correlation function may also be applied.

Once estimates of the channel weights are available for the data symbols, the data symbols can be estimated using, for instance, the maximum a posteriori ("MAP") algorithm. In one embodiment, the co-channel interferer can be comprised of quadrature phase shift keying ("QPSK") modulated data. For this type of interference, the estimate of the received data, $\hat{S}_{km}^0$, can be determined using, for instance, Equation (11).

$$\hat{S}_{km}^0 = \frac{\sum_i A_i p\left(\frac{R_{km}}{S_{km}^0 = A_i}\right)}{\sum_i p\left(\frac{R_{km}}{S_{km}^0 = A_i}\right)},$$ Equation (11)

where $$S_{km}^0 = A_i \in \left\{ \pm \frac{1}{\sqrt{2}} \pm \frac{j}{\sqrt{2}} \right\}$$

and $$p\left(\frac{R_{km}}{S_{km}^0}\right) = \sum_i p\left(\frac{R_{km}}{S_{km}^0, S_{km}^n = A_i}\right).$$

A person of ordinary skill in the art will recognize that other modulation schemes may be similarly determined.

Figure 5:
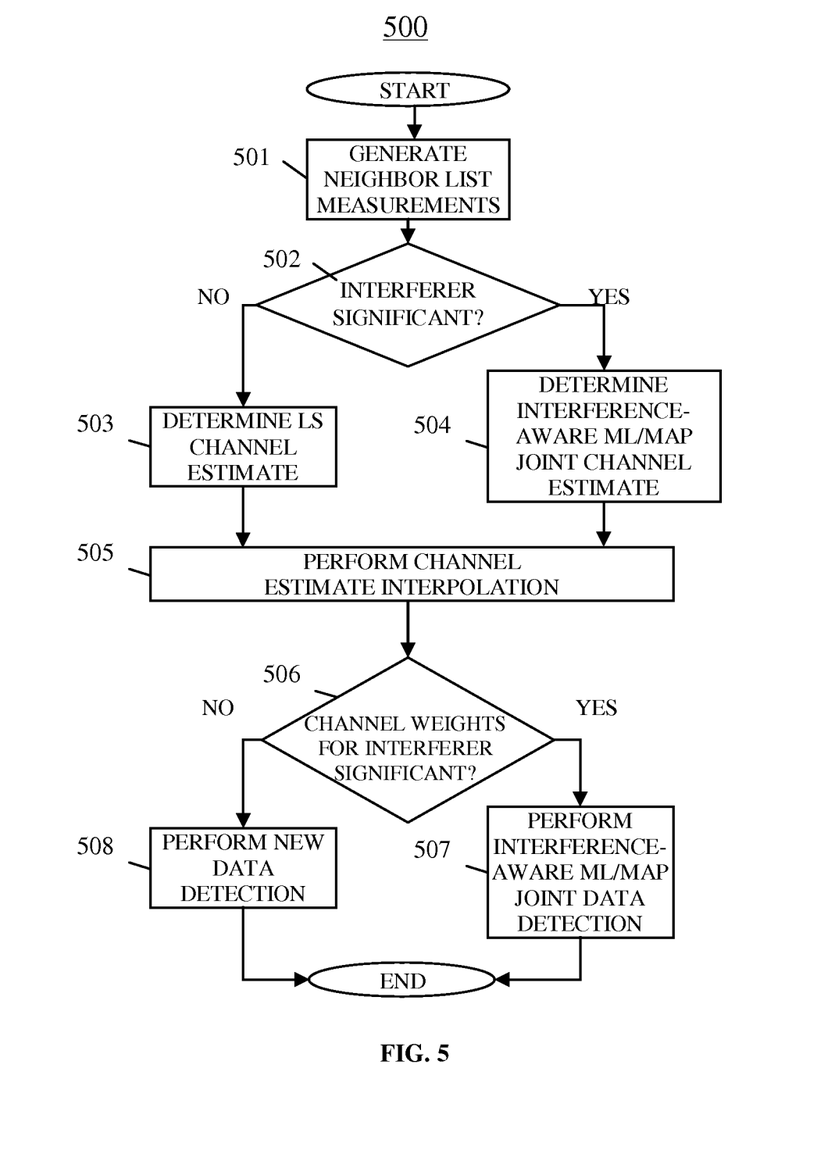
FIG. 5 is a flow chart of one embodiment of a channel estimation and data detection method in a wireless communication system in accordance with various aspects set forth herein.

FIG. 5 is a flow chart of one embodiment of a channel estimation and data detection method 500 in wireless communication system 100 and 200 in accordance with various aspects set forth herein. In FIG. 5, method 500 can start at block 501, where method 500 can detect the presence of interferers by monitoring interfering cells such as the nth interfering cell 141 and 241, cell-n. At block 502, method 500 determines whether a signal from an interfering cell 141 and 241 is present. In one embodiment, a metric such as given by Equation (12) can be evaluated to determine whether the signal from the interfering cell 141 and 241 is present. Equation (12) can evaluate the received signal power from serving cell 121 and 221 and interfering cell 141 and 241 by, for instance, cross-correlating the received samples corresponding to the RS symbol locations with the known RS symbol sequences from serving cell 121 and 221 and interfering cell 141 and 241, respectively. The received signal power from serving cell 121 and 221 and interfering cell 141 and 241 are compared to determine whether the interference signal is significant.

$$10 \log_{10} \frac{E_m\left[\left|\sum_{l=0}^{L-1} R_{(6l+\delta)m}(P^{0,m}(l))^*\right|^2\right]}{E_m\left[\left|\sum_{lk=0}^{L-1} R_{(6l+\delta)m}(P^{n,m}(l))^*\right|^2\right]} < \lambda,$$ Equation (12)

Where E[ ] represents the expectation operator over m, i.e. in the time domain. The superscript $(\ )^*$ represents complex conjugation. When interference is detected such as from interfering cell 141 and 241, at block 504, method 500 can estimate the channel weights, $\{\hat{C}_{km}^0, \hat{C}_{km}^n\}$, using, for instance, Equation (10). When interference is not detected, at block 503, method 500 can estimate the channel weights, $\hat{C}_{km}^0$, by using, for instance, the LS approach described by Equation (4).

At block 505, method 500 can interpolate the estimated RS channel weights obtained using the desired RS RE locations to determine the estimated data channel weights that correspond to the data RE locations. At block 506, method 500 can determine whether the estimated interference channel weights corresponding to the interference RS RE locations are significant using, for instance, Equation (12).

$$E_k[\|\hat{C}_{km}^n\|^2] < \hat{N}_0,$$ Equation (12)

where $E_k[\ ]$ represents the expectation operator over k.

Interference may be significant when, for instance, the interference is substantially associated with fast fading. If the interference channel weights are not significant, at block 508, method 500 can detect data using, for instance, the MMSE estimates of the data symbols as described by Equation (5). Alternatively, if the interference is significant, at block 507, method 500 can detect data using, for instance, the data detector described by Equation (11), other data detector or combination of data detectors.

In analyzing the performance of the proposed algorithm, the channel is assumed to be time invariant, so the impact on performance associated with time-domain interpolation can be reduced or eliminated. M is set to zero, so that, for instance, the adjacent time-domain samples are not used in estimating the channel weights. The minimum value of K is set to one, so that, for instance, one receive data sample on either side of the RE are considered for estimating the channel weights. At each RS, the determinant of the $P_{km}$ matrix, found on the right-hand side of Equation (10), is determined. If the determinant of the $P_{km}$ matrix is close to a singular value, K, is increased and Equation (10) is reevaluated.

In the simulations, cell-0 is serving cell 121 and 221, and cell-6 is interfering cell 141 and 241. Further, serving cell 121 and 221 and interfering cell 141 and 241 transmit QPSK-modulated data and interfering cell 141 and 241 continuously transmits over all the RBs of the serving cell, which can correspond to a $u_{km}$ of one. The average power ratio of the data RE to the RS RE is set to zero decibels ("dB"). The raw BER performance is determined for three different scenarios. The first scenario uses known channel weights. The second scenario uses the LS algorithm to estimate the channel weights. The third scenario uses the MAP algorithm to estimate the channel weights.

Figure 6:
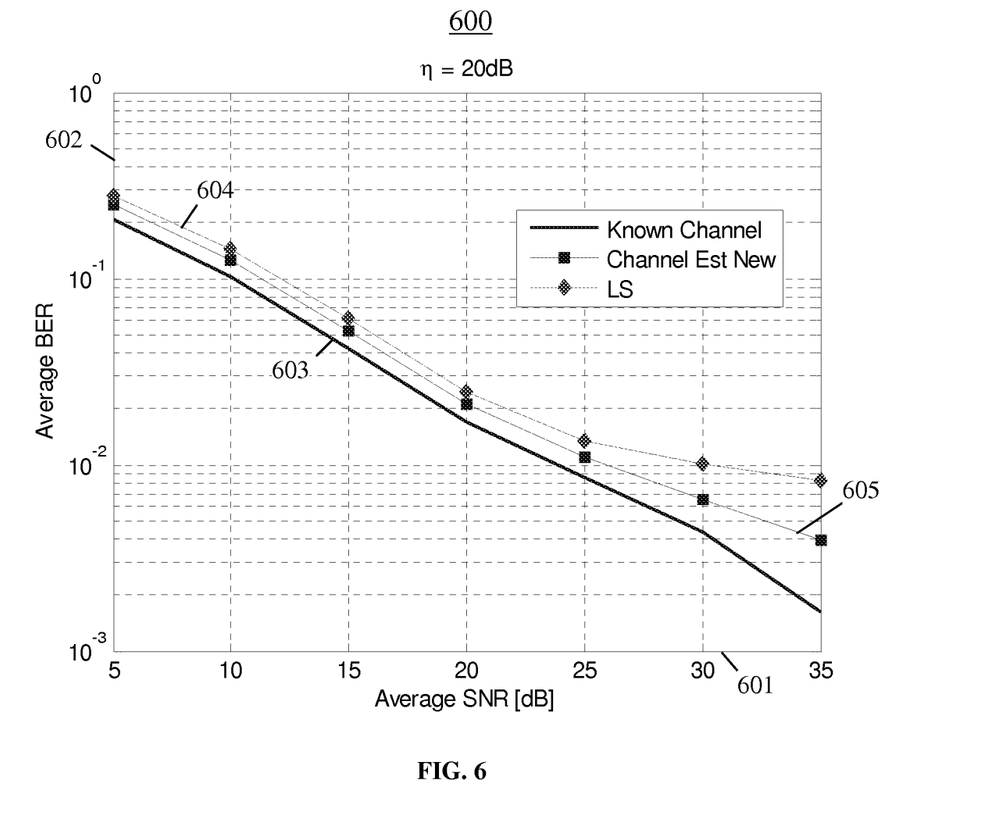
FIG. 6 illustrates simulated results of the performance of an exemplary embodiment of the channel estimation and data detection method in a wireless communication system in accordance with various aspects set forth herein.

FIG. 6 illustrates simulated results of the performance of an exemplary embodiment of channel estimation and data detection method 500 in wireless communication system 100 in accordance with various aspects set forth herein, where the signal to interference ("SIR") ratio, η, is twenty dB. The graphical illustration in its entirety is referred to by 600. The average signal to noise ration ("SNR") is shown on abscissa 601 and is plotted in the range from 5 dB to 35 dB. The average raw BER is shown on ordinate 602 and is plotted on a logarithmic scale. Graphs 603, 604 and 605 represent the simulation results for method 500. Graph 603 shows the average raw BER for known channel weights. Graph 604 shows the average raw BER for channel weights estimated using the LS algorithm. Graph 605 shows the average raw BER for channel weights estimated using the MAP algorithm.

Figure 7:
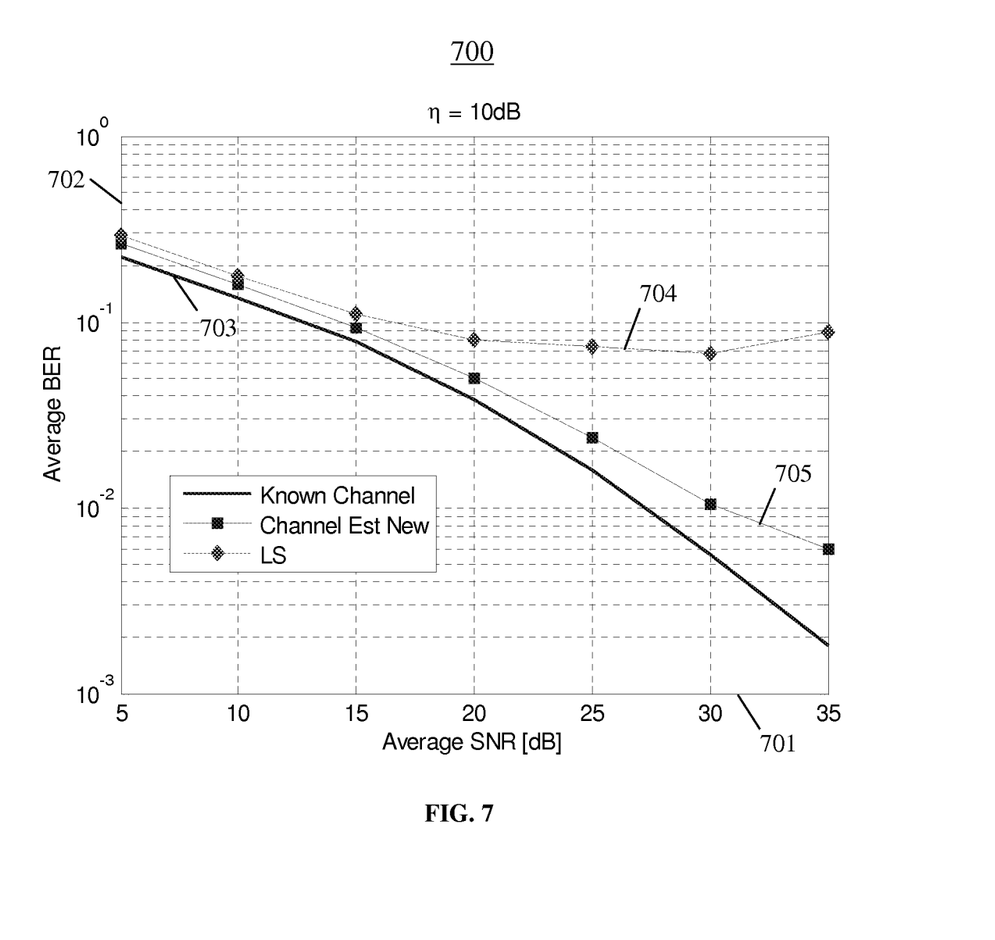
FIG. 7 illustrates simulated results of the performance of an exemplary embodiment of the channel estimation and data detection method in a wireless communication system in accordance with various aspects set forth herein.

FIG. 7 illustrates simulated results of the performance of an exemplary embodiment of channel estimation and data detection method 500 in wireless communication system 100 in accordance with various aspects set forth herein, where the signal to interference ("SIR") ratio, η, is ten dB. The graphical illustration in its entirety is referred to by 700. The average signal to noise ration ("SNR") is shown on abscissa 701 and is plotted in the range from 5 dB to 35 dB. The average raw BER is shown on ordinate 702 and is plotted on a logarithmic scale. Graphs 703, 704 and 705 represent the simulation results for method 500. Graph 703 shows the average raw BER for known channel weights. Graph 704 shows the average raw BER for channel weights estimated using the LS algorithm. Graph 705 shows the average raw BER for channel weights estimated using the MAP algorithm.

Figure 8:
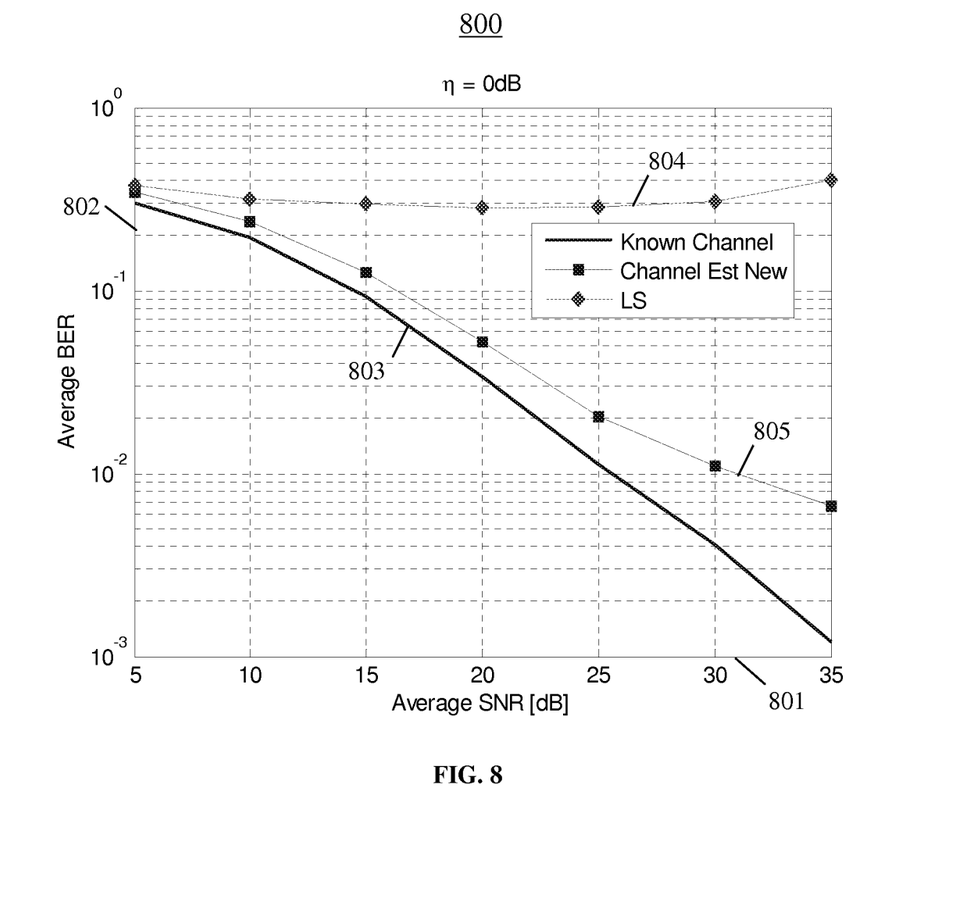
FIG. 8 illustrates simulated results of the performance of an exemplary embodiment of the channel estimation and data detection method in a wireless communication system in accordance with various aspects set forth herein.

FIG. 8 illustrates simulated results of the performance of an exemplary embodiment of channel estimation and data detection method 500 in wireless communication system 100 in accordance with various aspects set forth herein, where the signal to interference ("SIR") ratio, η, is twenty dB. The graphical illustration in its entirety is referred to by 800. The average signal to noise ration ("SNR") is shown on abscissa 801 and is plotted in the range from 5 dB to 35 dB. The average raw BER is shown on ordinate 802 and is plotted on a logarithmic scale. Graphs 803, 804 and 805 represent the simulation results for method 500. Graph 803 shows the average raw BER for known channel weights. Graph 804 shows the average raw BER for channel weights estimated using the LS algorithm. Graph 805 shows the average raw BER for channel weights estimated using the MAP algorithm.

In another embodiment, wireless device 101 and 201 has L antennas and base station 121 and 221 has J antennas. Therefore, he received signal for data RE(k, m) symbols can be represented using, for instance, Equation (13).

$$R_{km}(l) = \rho_{km}^0 \sum_{j=0}^{J-1} C_{km}^0(j,l) S_{km}^0(j) + u_{km} \rho_{km}^n \sum_{j=0}^{J-1} C_{km}^n(j,l) S_{km}^n(j) + N_{km}(l),$$ Equation (13)

where l=0, ..., L-1, j=0, ..., J-1, the first term, $$\rho_{km}^0 \sum_{j=0}^{J-1} C_{km}^0(j,l) S_{km}^0(j),$$

can represent the desired signal from serving cell 121 and 221, cell-0; the second term, $$u_{km} \rho_{km}^n \sum_{j=0}^{J-1} C_{km}^n(j,l) S_{km}^n(j),$$

can represent the interference signal from interfering cell 141 and 241, cell-n; and the third term, $N_{km}(l)$, can represent the thermal noise received by wireless device 101 and 201. Further, $R_{km}(l)$ can be the received data RE(k, m) symbol at the $l^{th}$ receive antenna of wireless device 101 and 201; $C_{km}^n(j,l)$ can be the channel weights associated with the data RE(k, m) symbol received by the lth receive antenna of wireless device 101 and 201 from the j th transmit antenna of interfering cell 141 and 241, cell-n; $S_{km}^n(j)$ can be the data RE(k, m) symbol transmitted on the j th transmit antenna by interfering cell 141 and 241, cell-n; and $N_{km}(l)$ can be AWGN associated with the data RE(k, m) symbol at wireless device 101 and 201 on its lth receive antenna. The parameter $u_{km}$ can be a value of, for instance, one to indicate transmission on the data RE(k, m) symbol and zero to indicate no transmission on the data RE(k, m) symbol from the interfering cell-n.

Further, in one embodiment, the received signal for the RS RE(k, m) symbol can be represented by, for instance, Equation (14). Note that Equation (14) has been written according to 3GPP Technical Specification 36.211, E-UTRA, *Physical Channels and Modulation*, Release 8, V. 8.6.0, March 2009 for LTE systems, when RS is transmitted on RE(k,m) of one antenna, the other antennas can transmit zeros on RE(k,). A person of ordinary skill in the art will recognize that Equation (14) can be applied to other RS structures.

$$R_{km}^0(l) = C_{km}^0(j,l) S_{km}^0(j) + C_{km}^n(j,l) S_{km}^n(j) + N_{km}^0(l),$$ Equation (14)

where l represents the receive antenna at wireless device 101 and 201 and j represents the transmit antenna at serving cell 121 and 221 and interfering cell 141 and 241. The first term of Equation (14), $C_{km}^0(j,l) S_{km}^0(j)$, can represent the received desired signal by wireless device 101 and 201 from serving cell 121 and 221, cell-0; the second term, $C_{km}^n(j,l) S_{km}^n(j)$, can represent the received interfering signal by wireless device 101 and 201 from interfering cell 141 and 241, cell-n; and the third term, $N_{km}^0(l)$, can represent the thermal noise received by wireless device 101 and 201.

Further, for the j th transmit antenna at interfering cell 141 and 241, cell-n, $S_{(\beta i+\alpha+\delta)m}^n(j)=P^{n,m}(i,j)$, where $i=0, 1, \ldots, L-1$ and $P^{n,m}(i,j)$ can represent the RS symbols transmitted by interfering cell 141 and 241, cell-n, as described in 3GPP Technical Specification 36.211, E-UTRA, *Physical Channels and Modulation*, Release 8, V. 8.6.0, March 2009.

In one embodiment, serving cell 121 and 221, cell-0, can have one transmit antenna and wireless device 101 and 201 can have two receive antennas. The data and interference information for the RE(k,m) can be jointly estimated using, for instance, Equation (15).

$$\begin{bmatrix} \hat{S}_{km}^0(0) \\ \hat{S}_{km}^n(0) \end{bmatrix} = C_{km}^{\perp} R, \quad \text{Equation (15)}$$

where $C_{km}^{\perp}$ is the pseudo inverse of $C_{km}$ and $$C_{km} = \begin{bmatrix} C_{km}^0(0,0) & C_{km}^n(0,0) \\ C_{km}^0(0,1) & C_{km}^n(0,1) \end{bmatrix}$$

and $$R = \begin{bmatrix} R_{km}^0(0) \\ R_{km}^0(1) \end{bmatrix}.$$

$\hat{S}_{km}^n(0)$ represents the soft estimate of the transmitted symbol from interfering cell 141 and 241, cell-n, on resource RE[k, m].

The data symbols can be determined using, for instance, Equation (16)

$$\hat{\hat{S}}_{km}^0 = Q_M[\hat{S}_{km}^0], \quad \text{Equation (16)}$$

where $Q_M$ is the quantization function for modulation format M. $\hat{\hat{S}}_{km}^n(0)$ can represent the hard decision of the transmitted symbol from interfering cell 141 and 241, cell-n, on resource RE [k,m]. The data and interferer information can be optionally re-detected using, for instance, a maximum likelihood detector. Further, the modulation format of the interference information may require using, for instance, blind detection.

In another embodiment, base station 121 and 221 can have two transmit antennas and wireless device 101 and 201 can have two receive antennas. The data and interference information can be jointly estimated using, for instance, Equation (17) or Equation (11).

$$\begin{bmatrix} \hat{S}_{km}^0(0) \\ \hat{S}_{km}^0(1) \\ \hat{S}_{km}^n(0) \\ \hat{S}_{km}^n(1) \end{bmatrix} = C_{km}^{\perp} R, \quad \text{Equation (17)}$$

where $C_{km}^{\perp}$ is the pseudo inverse of $C_{km}$ and $$R = \begin{bmatrix} R_{km}^0(0) \\ R_{km}^0(1) \end{bmatrix}.$$

$\hat{S}_{km}^n(j)$ represents the soft estimate of the transmitted symbol from interfering cell 141 and 241, cell-n, on resource RE[k, m] on the j th transmit antenna.

For example, for transmissions from the serving cell 121 and 221, cell-0, to wireless device 101 and 201 using a type of SFBC transmit diversity, the two detected symbols $\hat{S}_{km}^0(0)$ and $\hat{S}_{km}^0(1)$ from the first and second transmit antennas represent the even and odd information symbols, respectively, for instance, Equation (18). Further $C_{km}$ can be defined as follows:

$$C_{km} = \begin{bmatrix} C_{km}^0(0,0) & C_{km}^0(0,1) & C_{km}^n(0,0) & C_{km}^n(0,1) \\ -C_{km}^{0*}(1,0) & C_{km}^0(1,1) & -C_{km}^{n*}(1,0) & C_{km}^n(1,1) \\ C_{km}^0(0,1) & C_{km}^0(0,0) & C_{km}^n(0,1) & C_{km}^n(0,0) \\ C_{km}^{0*}(1,1) & C_{km}^0(1,0) & -C_{km}^{n*}(1,1) & C_{km}^{n*}(1,0) \end{bmatrix}.$$

$$\hat{S}_{km}^0(0) = \hat{S}_{even,m}^0,$$
$$\hat{S}_{km}^0(1) = \hat{S}_{odd,m}^{0*} \quad \text{Equation (18)}$$

The superscript ( )* indicates complex conjugation. The data symbols, $\hat{S}_{km}^0$, can be detected using, for instance, Equation (19).

$$\hat{\hat{S}}_{km}^0 = Q_M[\hat{S}_{km}^0], \quad \text{Equation (19)}$$

where $Q_M$ is the quantization function for modulation format M.

The data and interferer information can be optionally re-detected using, for instance, a maximum likelihood detector. Further, the modulation format of the interference information may require using, for instance, blind detection. Further, increased performance may be obtained by using iterative channel estimation based on the detected symbols, $\hat{S}_{km}^0$.

In another embodiment, cooperative transmission from multiple base stations 102 and 221 can send frequency-time orthogonal common reference signals ("CRS"), dedicated reference signals ("DRS") or both on the same RS RE symbols. Further, data can be encoded across base stations 102 and 221 using, for instance, SFBC transmit diversity, STBC transmit diversity, other diversity modes or combination of diversity modes, or independent data streams can be transmitted from each antenna.

In another embodiment, when the transmission is from multiple base stations 102 and 221 in, for instance, a multi-hop relay network, each base station 102 and 221 can simultaneously transmit the information with orthogonal DRS, orthogonal CRS or both on the same RS RE symbols. Data detection at wireless device 101 and 201 can be transparent, non transparent or both based on its channel estimation and data detection. Alternatively, wireless device 101 and 201 can be aware of the CRS transmission, DRS transmission or both, and can decode the information accordingly.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others will be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method of channel estimation and data detection in a wireless communication system, comprising:

receiving a signal, wherein said signal is composed of a data signal, a desired reference signal and an interference reference signal from an interfering cell;

selecting a channel estimator to generate channel estimate weights for said desired reference signal, said interference reference signal or both;

generating one or more reference signal channel estimate weights for said desired reference signal, said interference reference signal or both, using the selected channel estimator;

generating one or more data channel estimate weights using the one or more reference signal channel estimate weights;

determining whether the one or more data channel estimate weights indicate significant interference from the interfering cell;

selecting a data detector based on whether the one or more data channel estimate weights are determined to indicate significant interference from the interfering cell; and detecting said data signal using said selected data detector.

2. The method of claim 1, wherein said desired reference signal is transmitted from a serving cell.

3. The method of claim 1, wherein said interference reference signal is transmitted from a neighbor cell.

4. The method of claim 1, wherein said signal is an orthogonal frequency division multiplex ("OFDM") signal.

5. The method of claim 1, wherein when no significant interference from an interfering signal is detected, said selected channel estimator uses a least squares ("LS") channel estimator.

6. The method of claim 1, wherein when significant interference from an interfering signal is detected, said selected channel estimator uses a maximum likelihood ("ML") channel estimator, maximum a posteriori ("MAP") channel estimator or both.

7. The method of claim 1, wherein said generating one or more data channel estimate weights using said reference signal channel estimate weights further comprises applying an interpolation filter, smoothing filter or both.

8. The method of claim 7, wherein said interpolation filter is matched to a channel time-frequency correlation function.

9. The method of claim 1, wherein said generating one or more data channel estimate weights using said reference signal channel estimate weights further comprises using said detected data signal.

10. The method of claim 9, wherein said detected data signal includes a detected desired data signal and a detected interference data signal.

11. The method of claim 1, wherein said generating one or more data channel estimate weights using said reference signal channel estimate weights further comprises applying the minimum mean-square error ("MMSE") algorithm.

12. The method of claim 1, wherein when data channel estimate weights are determined to indicate significant interference, said selected data detector uses a maximum likelihood ("ML") data detector, a maximum a posteriori ("MAP") data detector or both.

13. The method of claim 1, wherein said selected data detector uses a minimum mean-square error ("MMSE") data detector.

14. The method of claim 1, wherein said data signal includes a desired data signal and an interference data signal.

15. A device in a wireless communication system, comprising:

a receiver configured to receive a signal, wherein said signal is composed of a data signal, a desired reference signal and an interference reference signal from an interfering cell; and a controller operative to select a channel estimator to generate channel estimate weights for said desired reference signal, said interference reference signal or both, generate one or more reference signal channel estimate weights for said desired reference signal, said interference reference signal or both, using the selected channel estimator, generate one or more data channel estimate weights using the one or more reference signal channel estimate weights, determine whether the one or more data channel estimate weights indicate significant interference from the interfering cell; select a data detector based on whether the one or more data channel estimate weights were determined to indicate significant interference from the interfering cell; and detect said data signal using said selected data detector.

16. A device in a wireless communication system, comprising:

a receiver configured to receive a signal, wherein said signal is composed of a data signal, a desired reference signal and an interference reference signal from an interfering cell; and a channel estimator processor operative to select a channel estimator to generate channel estimate weights for said desired reference signal, said interference reference signal or both, generate one or more reference signal channel estimate weights for said desired reference signal, said interference reference signal or both, using the selected channel estimator, generate one or more data channel estimate weights using the one or more reference signal channel estimate weights, determine whether the one or more data channel estimate weights indicate significant interference from the interfering cell; select a data detector based on whether the one or more data channel estimate weights were determined to indicate significant interference from the interfering cell; and detect said data signal using said selected data detector.

* * * * *